United States Patent
Na et al.

(10) Patent No.: US 11,182,555 B2
(45) Date of Patent: Nov. 23, 2021

(54) METHOD AND APPARATUS FOR PROCESSING SEQUENCE

(71) Applicant: Samsung Electronics Co., Ltd., Suwon-si (KR)

(72) Inventors: Hwidong Na, Seongnam-si (KR); Min-Joong Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 125 days.

(21) Appl. No.: 16/844,362

(22) Filed: Apr. 9, 2020

(65) Prior Publication Data

US 2021/0081610 A1 Mar. 18, 2021

(30) Foreign Application Priority Data

Sep. 18, 2019 (KR) .................. 10-2019-0114764

(51) Int. Cl.
  *G06F 40/279* (2020.01)
(52) U.S. Cl.
  CPC .................. *G06F 40/279* (2020.01)
(58) Field of Classification Search
  CPC ....... G06F 40/279; G06F 40/30; G06F 40/205
  USPC ....................................... 704/251
  See application file for complete search history.

(56) References Cited

U.S. PATENT DOCUMENTS

| 10,181,098 B2 | 1/2019 | Vinyals et al. |
| 10,229,111 B1 | 3/2019 | Filippova et al. |
| 2014/0229158 A1 | 8/2014 | Zweig et al. |
| 2019/0130273 A1 | 5/2019 | Keskar et al. |
| 2019/0180165 A1 | 6/2019 | Vinyals et al. |

FOREIGN PATENT DOCUMENTS

| KR | 10-2008-0032480 A | 4/2008 |
| KR | 10-2019-0050698 A | 5/2019 |
| KR | 10-2019-0059033 A | 5/2019 |
| WO | WO 02/27546 A3 | 4/2002 |
| WO | WO 03/032499 A1 | 4/2003 |
| WO | WO 2004/097673 A1 | 11/2004 |

*Primary Examiner* — Thierry L Pham
(74) *Attorney, Agent, or Firm* — NSIP Law

(57) ABSTRACT

A sequence processing method and apparatus are provided. The sequence processing method includes determining a word of a first R-node corresponding to a root node based on an input sequence, generating first I-nodes that are connected to the first R-node and include relative position information with respect to the word of the first R-node, determining a word of a second R-node to correspond to each of the first I-nodes, and determining an output sequence corresponding to the input sequence based on the determined words.

21 Claims, 13 Drawing Sheets

METHOD AND APPARATUS FOR PROCESSING SEQUENCE

CROSS-REFERENCE TO RELATED APPLICATIONS

This application claims the benefit under 35 USC § 119(a) of Korean Patent Application No. 10-2019-0114764, filed on Sep. 18, 2019, in the Korean Intellectual Property Office, the entire disclosure of which is incorporated herein by reference for all purposes.

BACKGROUND

1. Field

The following description relates to relates to a sequence processing method and apparatus.

2. Description of Related Art

Parallel decoding is a method of generating several elements of a sequence all at once. In the parallel decoding, it is difficult to consider a relationship between words that are generated when a whole sequence is generated all at once, and is also difficult to reuse a previous operation result when a portion of a sequence is generated all at once.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a sequence processing method including determining a word of a first R-node corresponding to a root node based on an input sequence, generating first I-nodes that are connected to the first R-node and include relative position information with respect to the word of the first R-node, determining a word of a second R-node to correspond to each of the first I-nodes, and determining an output sequence corresponding to the input sequence based on the determined words.

The determining of the word of the first R-node may include determining the word of the first R-node to minimize a number of times an R-node and an I-node are generated for determination of the output sequence.

The determining of the word of the first R-node may include determining a word expected to be located at the center from among words included in the output sequence as the word of the first R-node.

The sequence processing method may include generating second I-nodes that are connected to the second R-node and that include relative position information with respect to the word of the second R-node, in response to the word of the second R-node being determined, and determining a word of a third R-node to correspond to each of the second I-nodes.

The determining of the output sequence may include determining the output sequence based on the word of the first R-node, in response to the word of the second R-node not being determined.

The determining of the output sequence may include determining the output sequence by arranging the determined words in a tree structure between generated R-nodes based on an in-order traversal.

The generating of the first I-nodes may include generating a predetermined number of first I-nodes or a number of first I-nodes that is dynamically determined based on at least one of the input sequence or the output sequence, the first I-nodes comprising pieces of relative position information with respect to the word of the first R-node.

The determining of the word of the second R-node may include determining the word of the second R-node based on a first I-node adjacent to a first I-node corresponding to the second R-node.

The sequence processing may include generating second I-nodes that are connected to the second R-node and include relative position information with respect to the word of the second R-node, and determining a word of a third R-node to correspond to each of the second I-nodes based on a second R-node adjacent to a second R-node that is a parent node of the third R-node.

The determining of the word of the third R-node may include determining the word of the third R-node based on one second R-node that is selected based on a second I-node corresponding to the third R-node from second R-nodes adjacent to the second R-node that is the parent node of the third R-node.

The determining of the word of the first R-node may include determining the word of the first R-node using a decoder and context information of the input sequence output from an encoder receiving the input sequence.

The determining of the word of the first R-node may include determining the word of the first R-node using a neural language model to which the input sequence is input.

The input sequence and the output sequence may include one of sentence data, voice data, image data, biodata, or handwriting data.

The first R-node and the second R-node each may include a word included in the output sequence, and the word of the second R-node is based on the relative position information of the first I-node.

A number of the first I-nodes may be based on any one or any combination of a type of the input sequence, a type of the output sequence, and an estimated length of the output sequence.

In another general aspect, there is provided a sequence processing apparatus including a processor configured to determine a word of a first R-node corresponding to a root node based on an input sequence, generate first I-nodes that are connected to the first R-node and include relative position information with respect to the word of the first R-node, determine a word of a second R-node to correspond to each of the first I-nodes, and determine an output sequence corresponding to the input sequence based on the determined words.

The processor may be configured to determine the word of the first R-node to minimize a number of times an R-node and an I-node are generated for determination of the output sequence.

The processor may be configured to generate second I-nodes that are connected to the second R-node and that include relative position information with respect to the word of the second R-node, in response to the word of the second R-node being determined, and determine a word of a third R-node to correspond to each of the second I-nodes.

The processor may be configured to determine the output sequence based on the word of the first R-node, in response to the word of the second R-node not being determined.

The processor may be configured to determine the output sequence by arranging the determined words in a tree structure between generated R-nodes based on an in-order traversal.

Other features and aspects will be apparent from the following detailed description, the drawings, and the claims.

Figure 1:
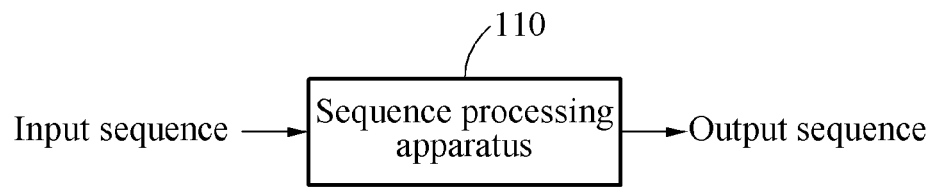
FIG. 1 illustrates an example of an operation of a sequence processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, examples will be described in detail with reference to the accompanying drawings, and like reference numerals in the drawings refer to like elements throughout.

FIG. 1 illustrates an example of an operation of a sequence processing apparatus 110.

Referring to FIG. 1, the sequence processing apparatus 110 processes an input sequence and determines an output sequence. At least one of the input sequence and the output sequence may include temporal data or data with an order, for example, sentence data, voice data, image data, biodata, or handwriting data.

In an example, when a voice recognition is performed in the sequence processing apparatus 110, the input sequence may be voice data including a voice of a user, and the output sequence may be sentence data including at least one word. In another example, when a machine translation is performed in the sequence processing apparatus 110, the input sequence may be sentence data expressed by a first language, and the output sequence may be sentence data expressed by a second language. In another example, when a voice synthesis is performed in the sequence processing apparatus 110, the input sequence may be sentence data, and the output sequence may be voice data. In another example, when a machine interpretation is performed in the sequence processing apparatus 110, the input sequence may be voice data expressed by a first language, and the output sequence may be voice data expressed by a second language. In another example, when a handwriting recognition is performed in the sequence processing apparatus 110, the input sequence may be handwriting data written by a user, and the output sequence may be sentence data.

As described above, the sequence processing apparatus 110 may be broadly used in various fields, for example, a voice recognition, a voice synthesis, a machine translation, a machine interpretation, or a handwriting recognition. In the following description, an operation of the sequence processing apparatus 110 will be described based on an example in which a voice recognition is performed in the sequence processing apparatus 110, for convenience of description, however, examples are not limited thereto. The following description may apply to a voice synthesis, a machine translation, a machine interpretation, or a handwriting recognition as well as the voice recognition.

The sequence processing apparatus 110 may verify a relationship between words generated at different positions while generating a portion of the output sequence at once and may reuse a word that is generated in advance, and thus it is possible to enhance both an accuracy of a generation of an output sequence and an operation efficiency. The above operation is referred to as a "parallel inference", and a tree structure for the parallel inference may be provided. The tree structure will be further described with reference to FIGS. 2 through 10 below.

FIGS. 2 through 10 illustrate examples of a tree structure to determine an output sequence.

Figure 2:
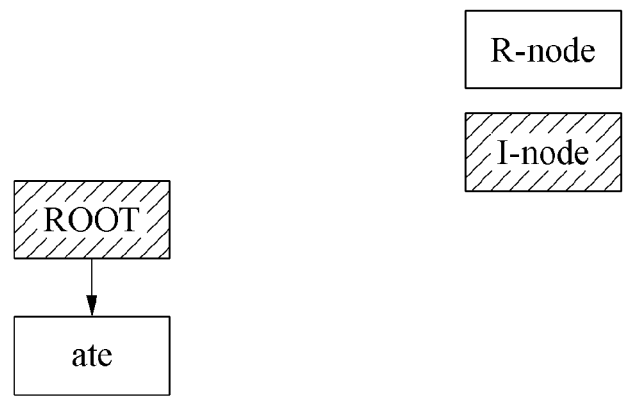
FIGS. 2 through 10 illustrate examples of a tree structure to determine an output sequence.

FIG. 2 illustrates an example of a tree structure generated at a time t=1 in a sequence processing apparatus.

The tree structure includes an R-node and an I-node. The R-node is a real node that includes a word that may be actually included in an output sequence, and the I-node is an imaginary node that includes relative position information with respect to a corresponding R-node as information that is used to generate a word of the R-node.

The sequence processing apparatus determines a word of an R-node corresponding to a root node based on an input sequence. The sequence processing apparatus may determine a word of an R-node so that a number of times (or a generation time) an R-node and an I-node are generated for determination of an output sequence may be minimized. For example, the sequence processing apparatus may determine, as a word of an R-node, a word expected to be located at the center among words included in an output sequence. Determining a word of an R-node that is a root node in a tree structure to be a word located at the center of the output sequence may minimize a height of the tree structure so as to minimize a number of times an R-node and an I-node are generated, which will be further described below. In the example of FIG. 2, "ate" is assumed to be generated as a word of an R-node that is a root node, which is hereinafter referred to as an R-node "ate" for convenience of description.

In an example, the sequence processing apparatus may determine the output sequence using an encoder-decoder model. In this example, an input sequence may be input to an encoder, context information may be determined, and a word of an R-node that is a root node may be determined using a decoder and the determined context information.

In another example, the sequence processing apparatus may determine the output sequence using a neural language model that predicts a next word based on given words. In this example, an input sequence may be input to the neural language model, and a word of an R-node that is a root node may be determined using the neural language model to which the input sequence is input. Also, a separate encoder is not required.

In an example, the sequence processing apparatus may determine the output sequence using an artificial neural network including a two-dimensional convolutional neural network (CNN) and a pretrained spatial pyramid pooling network. In an example, the CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). In an example, the CNN includes a plurality of layers, each including a plurality of nodes. Also, the CNN includes connection weights that connect the plurality of nodes included in each of the plurality of layers to a node included in another layer of the CNN.

In an example, the CNN may receive an input sequence that may be voice data including a voice of a user. In such an example, a convolution operation is performed on the input sequence with a kernel, and as a result, the feature maps are output. The convolution operation is performed again on the output feature maps as input feature maps, with a kernel, and new feature maps are output. When the convolution operation is repeatedly performed as such, an output sequence including sentence data and at least one word may be finally output through the output layer of the CNN.

Figure 3:
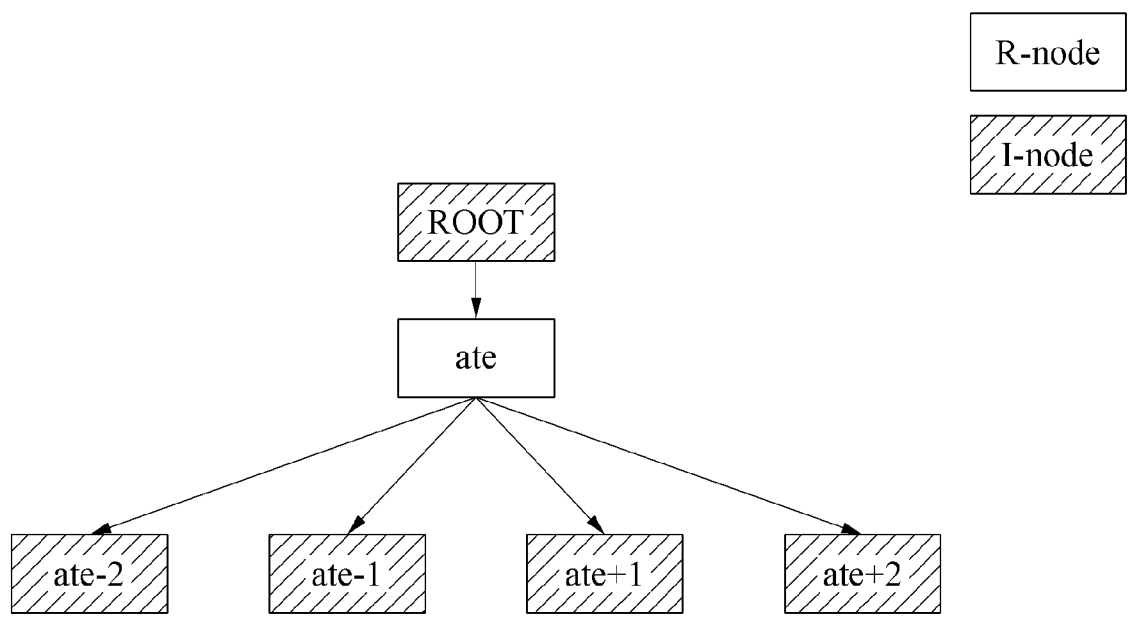

FIG. 3 illustrates an example of a tree structure generated at a time t=2 in a sequence processing apparatus.

The sequence processing apparatus generates a plurality of I-nodes that are connected to an R-node "ate" and that include relative position information with respect to a word of the R-node, which is "ate". The plurality of I-nodes include different pieces of relative position information with respect to the word "ate". For example, the plurality of I-nodes include relative position information "ate−2", "ate−1", "ate+1" and "ate+2". In this example, "ate−2" may be position information indicating a word preceding the word "ate" in a resulting sequence. Also, "ate−1" may be position information indicating a word preceding the word "ate" and following a word of "ate−2" in the resulting sequence. In an example, "ate+1" may be position information indicating a word following the word "ate" and preceding a word of "ate+2" in the resulting sequence. In an example, "ate+2" may be position information indicating a word following the word "ate" in the resulting sequence.

A number of I-nodes to be generated may be determined in advance, or may be dynamically determined based on the input sequence and/or the output sequence. In an example, the number of I-nodes to be generated may be set in advance by a manager or a user. In another example, an optimal number of I-nodes to be generated may be dynamically determined based on a type of the input sequence, a type of the output sequence, and an estimated length of the output sequence. For example, when the estimated length of the output sequence predicted based on the input sequence increases, the number of I-nodes to be generated may also increase.

In an example, the plurality of I-nodes may be simultaneously generated.

Figure 4:
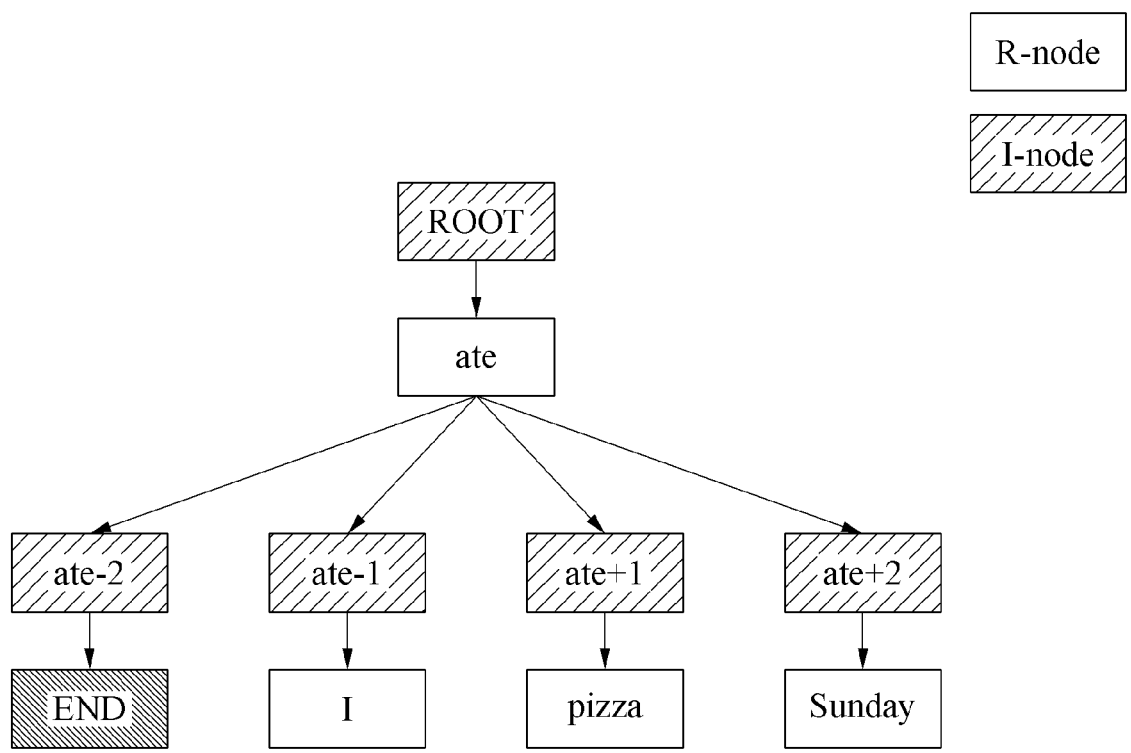

FIG. 4 illustrates an example of a tree structure generated at a time t=3 in a sequence processing apparatus.

The sequence processing apparatus generates an R-node corresponding to each of a plurality of I-nodes and determines a word of the generated R-node. In FIG. 4, four R-nodes respectively corresponding to four I-nodes are generated. The I-nodes and the R-nodes may be a one-to-one correspondence relationship.

In the example of FIG. 4, the sequence processing apparatus determines a word of an R-node generated to correspond to an I-node "ate−1" to be "I", and the word "I" precedes a word "ate" in a resulting sequence. Also, the sequence processing apparatus determines a word of an R-node generated to correspond to an I-node "ate+1" to be "pizza", and the word "pizza" follows the word "ate" in the resulting sequence. The sequence processing apparatus determines a word of an R-node generated to correspond to an I-node "ate+2" to be "Sunday", and the word "Sunday" follows the words "ate" and "pizza" in the resulting sequence.

The sequence processing apparatus does not determine a word of an R-node generated to correspond to an I-node "ate−2". This is because although the word of the R-node generated to correspond to the I-node "ate−2" needs to precede the word "I" in the resulting sequence, any word preceding the word "I" does not exist since the word "I" is located at the beginning of the resulting sequence. Thus, the sequence processing apparatus may determine that there is no more extensibility and may not determine a word. In the example of FIG. 4, an R-node with a nondetermined word is marked as END.

In an example, a word of a second R-node generated to correspond to each of a plurality of first I-nodes may be determined at once. That is, a portion of the resulting sequence may be generated at once based on a word that is determined in advance and relative position information with respect to the word, and thus an accuracy of the resulting sequence and an operation efficiency may be simultaneously enhanced.

In an example, when the sequence processing apparatus uses an encoder model, a word of a generated R-node may be determined based on context information from an encoder, relative position information of a corresponding I-node, and a word (for example, "ate") of a corresponding R-node.

In an example, when the sequence processing apparatus uses a neural language model, a word of a generated R-node may be determined based on an input sequence input to the neural language model, relative position information of a corresponding I-node, and a word (for example, "ate") of a corresponding R-node.

Figure 5:
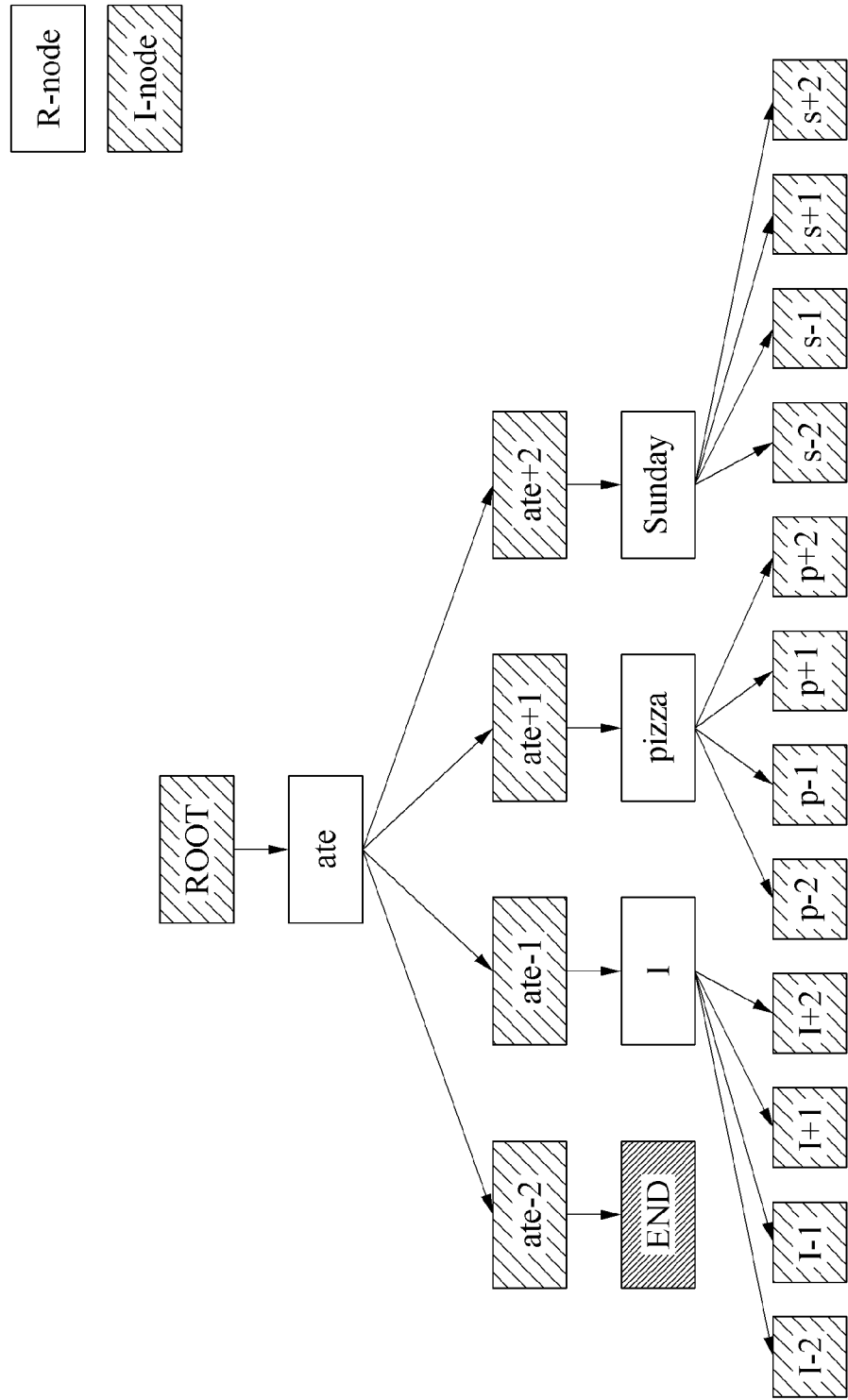

FIG. 5 illustrates an example of a tree structure generated at a time t=4 in a sequence processing apparatus.

The sequence processing apparatus generates a plurality of I-nodes that are connected to each of R-nodes generated at a time t=3 and that include relative position information with respect to a word of each of the R-nodes. For example, the sequence processing apparatus generates a plurality of I-nodes that are connected to an R-node "pizza" and that include relative position information with respect to the word "pizza". In an example, the plurality of generated I-nodes include different pieces of relative position information, for example, "p−2", "p−1", "p+1", and "p+2". In an example, "p−2" may be position information indicating a word preceding the word "pizza" and following a word "ate" in a resulting sequence. In an example, "p−1" may be position information indicating a word preceding the word "pizza" and following a word of "p−2" in the resulting sequence. In an example, "p+1" may be position information indicating a word following the word "pizza" and preceding a word of "p+2" in the resulting sequence. In an example, "p+2" may be position information indicating a word following the word "pizza" and preceding a word "Sunday" in the resulting sequence.

In the example of FIG. 5, an I-node corresponding to an R-node that has a non-determined word and that is marked as END is not generated, because there is no more extensibility.

Figure 6:
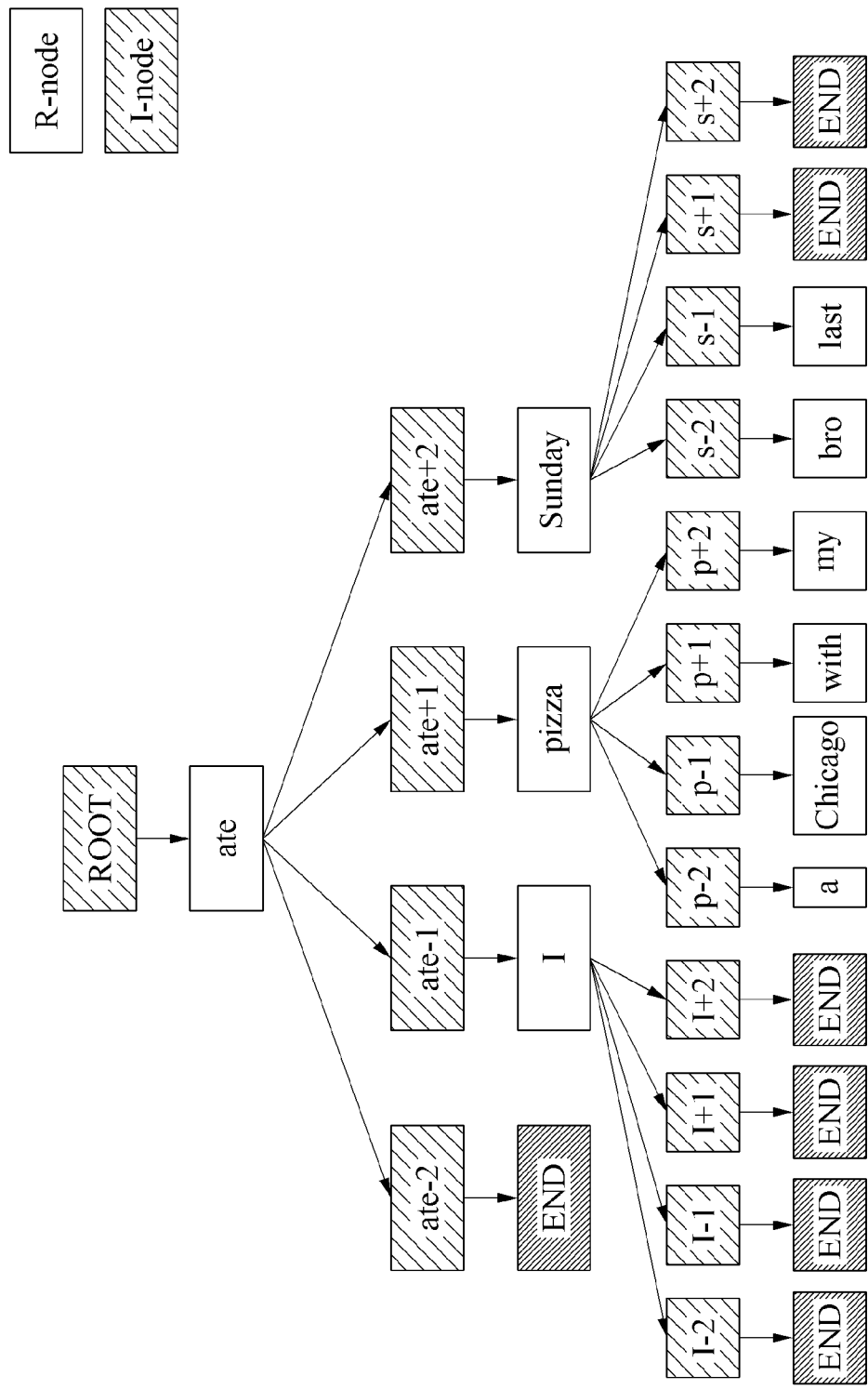

FIG. 6 illustrates an example of a tree structure generated at a time t=5 in a sequence processing apparatus.

The sequence processing apparatus generates an R-node corresponding to each of a plurality of I-nodes generated at a time t=4, and determines a word of the generated R-node. R-nodes respectively corresponding to the I-nodes generated at the time t=4 are generated. Also, a word of an R-node may be determined based on relative position information of a corresponding I-node. However, when there is no more extensibility, the word may not be determined.

The above description is equally applicable to a process of generating an R-node at the time t=5 and determining a word of the generated R-node, and thus further description thereof is not repeated herein.

Figure 7:
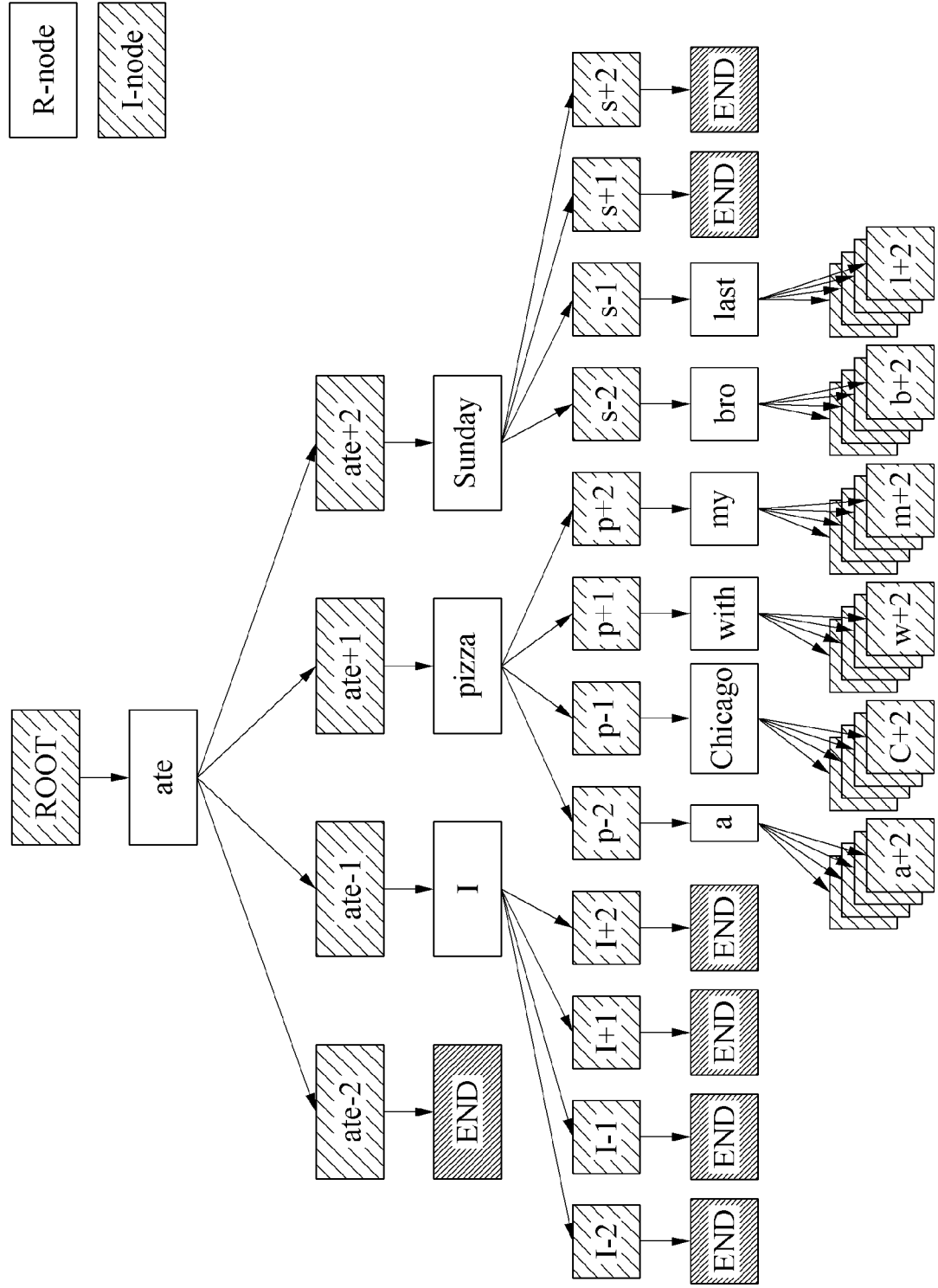

FIG. 7 illustrates an example of a tree structure generated at a time t=6 in a sequence processing apparatus.

The sequence processing apparatus generates a plurality of I-nodes that are connected to each of R-nodes generated at a time t=5 and that include relative position information with respect to a word of each of the R-nodes. An I-node corresponding to an R-node that has a non-determined word and that is marked as END is not generated. The above description is equally applicable to a process of generating a plurality of I-nodes at the time t=6, and thus further description thereof is not repeated herein.

Figure 8:
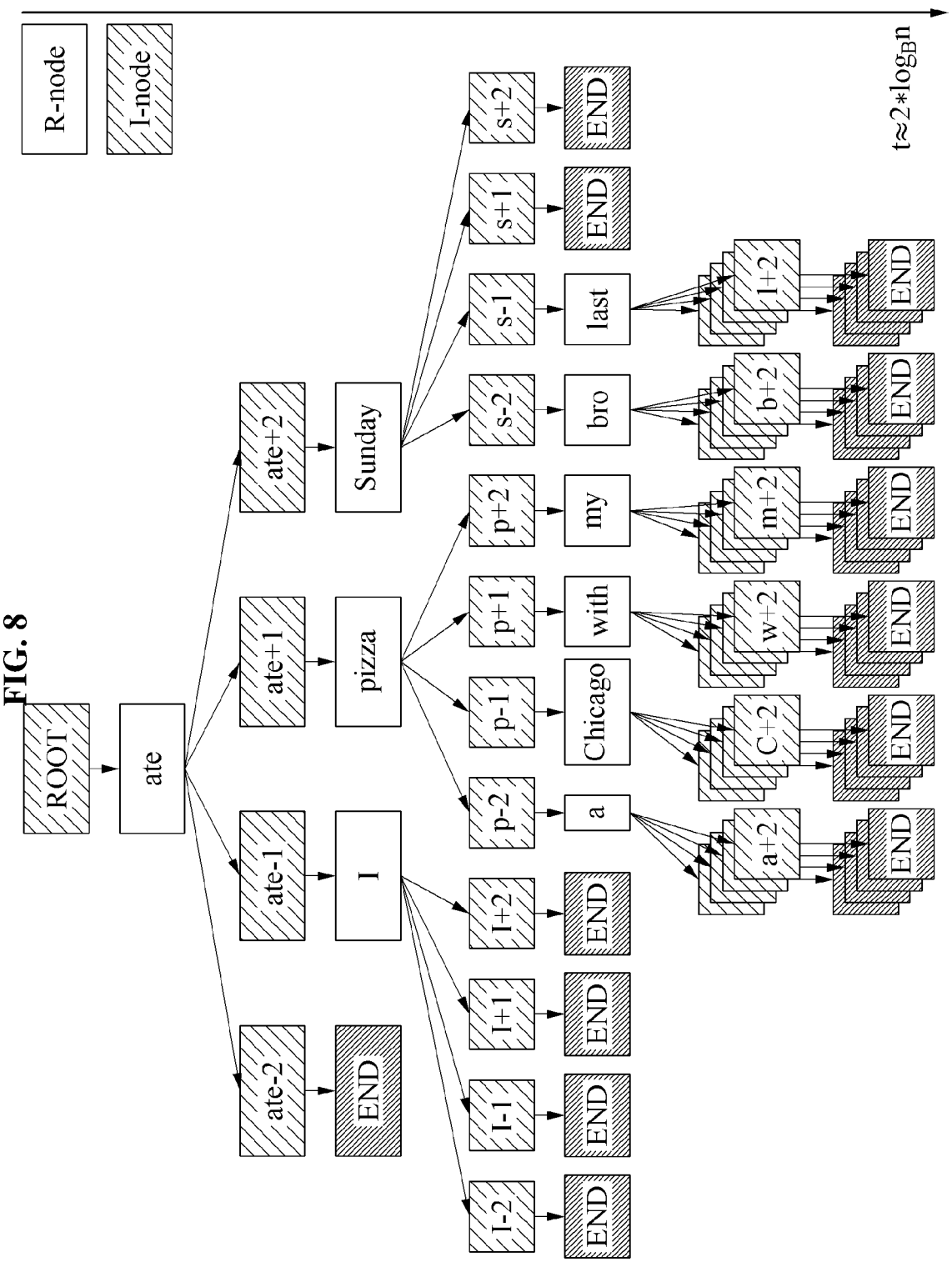

FIG. 8 illustrates an example of a tree structure generated at a time t=7 in a sequence processing apparatus.

The sequence processing apparatus generates an R-node corresponding to each of a plurality of I-nodes generated at a time t=6, and determines a word of the generated R-node. R-nodes respectively corresponding to the I-nodes generated at the time t=6 are generated. Also, a word of an R-node may be determined based on relative position information of a corresponding I-node. However, when there is no more extensibility, the word may not be determined. In the example of FIG. 8, a word is not determined since there is no extensibility of all generated R-nodes. In other words, the generated R-nodes are marked as END. The above description is equally applicable to a process of generating an R-node at the time t=7 and determining a word of the generated R-node, and thus further description thereof is not repeated herein.

An optimal time t used to generate a tree structure for determination of an output sequence is expressed by Equation 1 shown below.

$$t \approx 2 * \log_B n \qquad \text{[Equation 1]}$$

In Equation 1, n denotes a length of a resulting sequence, and B denotes a number of I-nodes generated to correspond to a single R-node.

Examples of a process of generating a tree structure are described in a chronological order in FIGS. 2 through 8, and the process of generating the tree structure may be displayed on a display of a user terminal so that a user may verify a processing process.

Figure 9:
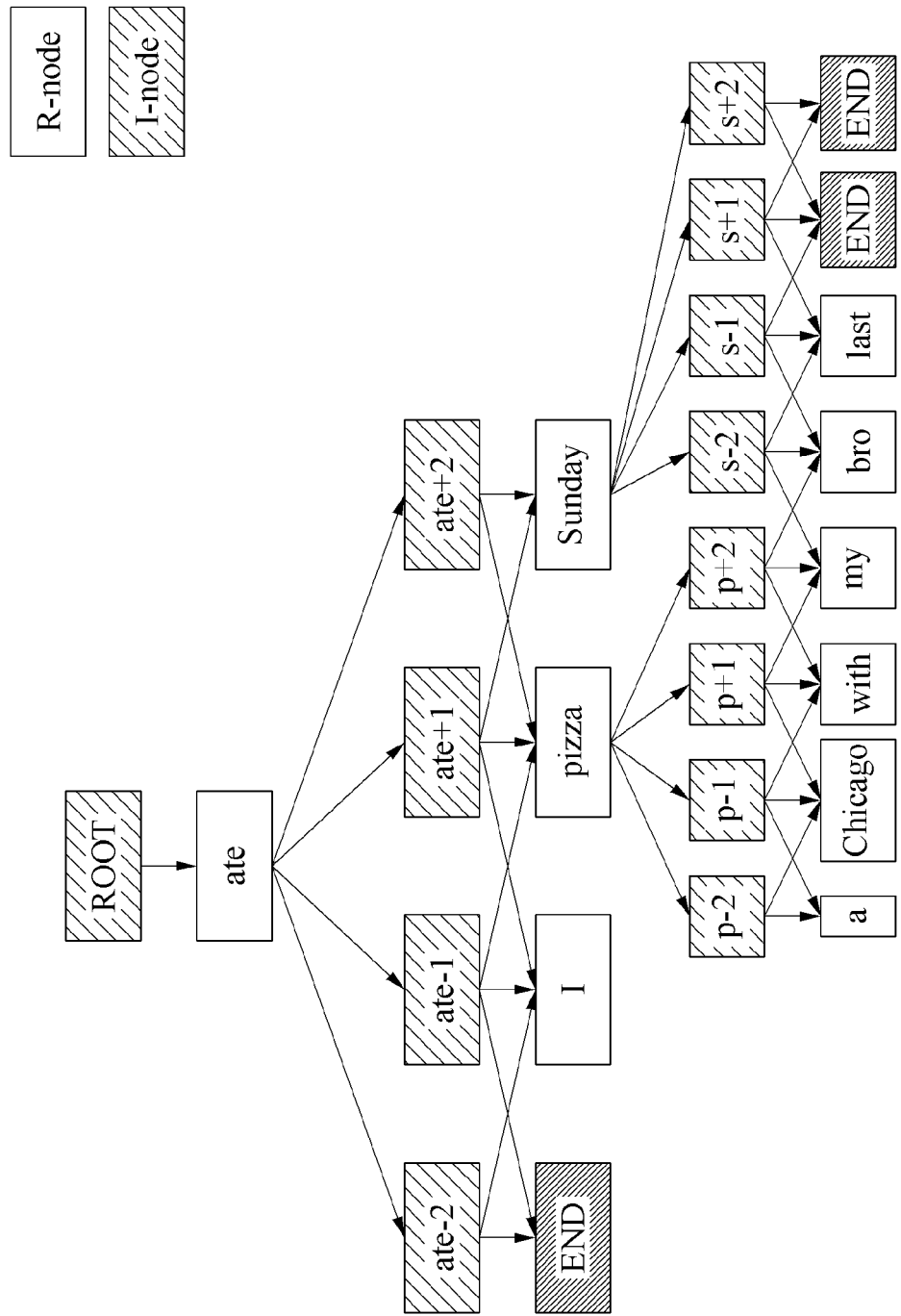

FIG. 9 illustrates an example of using a neighboring I-node to determine a word of an R-node.

A sequence processing apparatus determines a word of an R-node based on an I-node adjacent to an I-node corresponding to the R-node. In an example, when the sequence processing apparatus determines a word of an R-node "I", relative position information of an I-node "ate−1" corresponding to the R-node "I" may be used and relative position information of I-nodes "ate−2" and "ate+1" adjacent to the I-node "ate−1" may also be used. In another example, when the sequence processing apparatus determines a word of an R-node "my", relative position information of an I-node "p+2" corresponding to the R-node "my" may be used and relative position information of I-nodes "p+1" and "s−2" adjacent to the I-node "p+2" may also be used.

Although an example in which two neighboring I-nodes are additionally used is described in FIG. 9 for convenience of description, a number of I-nodes to be used is not limited thereto. Also, various numbers of I-nodes may be additionally used. Depending on examples, the number of I-nodes to be used may be determined in advance, and a parallelization of inference may be maximized by equalizing the number of I-nodes to be used to determine words of all R-nodes.

Figure 10:
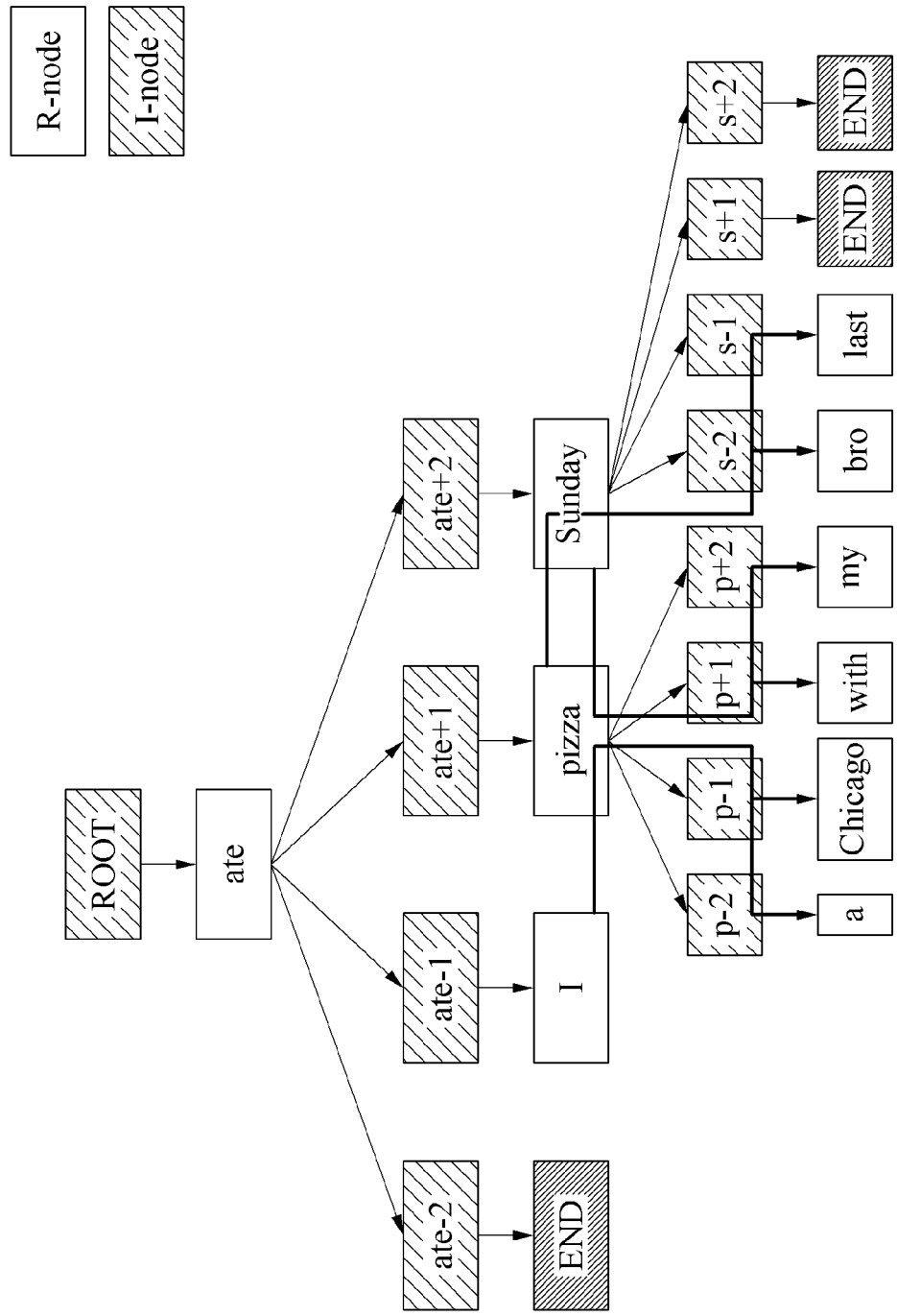

FIG. 10 illustrates an example of using a neighboring R-node to determine a word of an R-node.

In an example, a sequence processing apparatus determines a word of an R-node based on a neighboring R-node adjacent to a parent R-node of the R-node. In an example, the neighboring R-node may be selected from R-nodes adjacent to the parent R-node based on an I-node corresponding to the R-node of which the word is to be determined. For example, an R-node to be used may be selected from R-nodes adjacent to the parent R-node based on whether relative position information of the I-node indicates a front side or a rear side of the parent R-node.

In an example, an I-node "p−1" corresponding to an R-node "Chicago" includes position information indicating a word preceding a word "pizza" of a parent R-node. In this example, when the sequence processing apparatus determines a word of the R-node "Chicago", an R-node "I" may be selected from the R-node "I" and an R-node "Sunday" that are adjacent to the parent R-node "pizza" and may be additionally used. In another example, an I-node "p+2" corresponding to an R-node "my" includes position information indicating a word following the word "pizza" of the parent R-node. In this example, when the sequence processing apparatus determines a word of the R-node "my", the R-node "Sunday" may be selected from the R-nodes "I" and "Sunday" adjacent to the parent R-node "pizza" and may be additionally used. Similarly, the R-node "I" may be additionally used to determine a word of an R-node "a", the R-node "Sunday" may be additionally used to determine a word of an R-node "with", and the parent R-node "pizza" may be additionally used to determine words of R nodes "bro" and "last".

Although an example in which a single neighboring R-node is additionally used is described in FIG. 10 for convenience of description, a number of R-nodes to be used is not limited thereto. Also, various numbers of R-nodes may be additionally used. Depending on examples, the number of R-nodes to be used may be determined in advance, and a parallelization of inference may be maximized by equalizing the number of R-nodes to be used to determine words of all R-nodes.

As described above, a neighboring I-node and/or a neighboring R-node may be additionally used to determine a word of an R-node, and thus an output sequence may be determined by effectively using a relationship between generated words so that the same word may not be repeatedly generated or that the words may not be mixed regardless of an order of the words.

Figure 11:
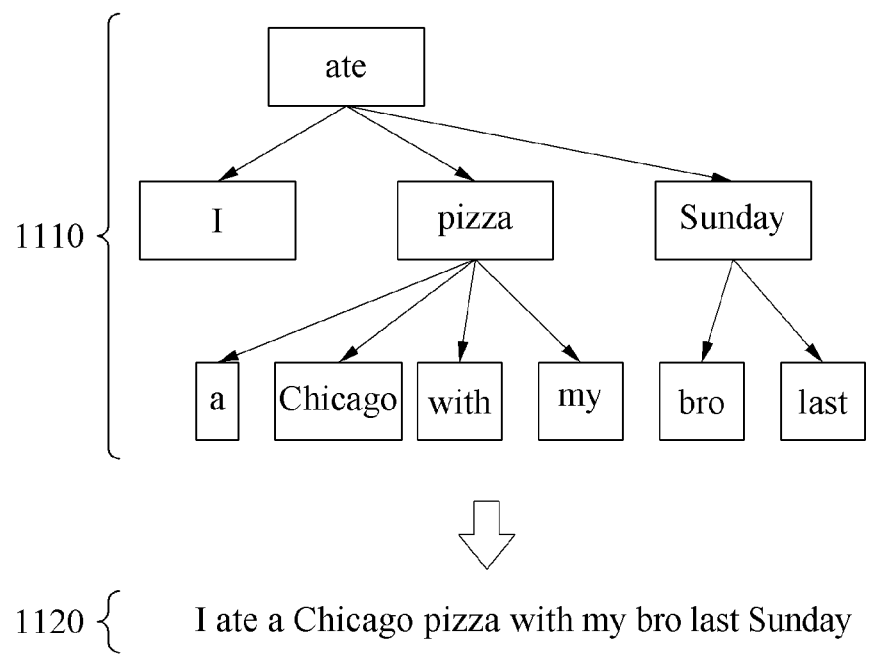
FIG. 11 illustrates an example of a process of determining an output sequence in a tree structure.

FIG. 11 illustrates an example of a process of determining an output sequence in a tree structure.

FIG. 11 illustrates a tree structure 1110 and an output sequence 1120.

As described above, when a word is not determined due to a lack of an extensibility of all generated R-nodes, a tree structure generation process may be terminated. When the tree structure generation process is terminated, all I-nodes may be removed and only R-nodes and a relationship between the R-nodes may remain, and accordingly the tree structure 1110 may be determined. The sequence processing apparatus may determine the output sequence 1120 by arranging words based on an in-order traversal in the tree structure 1110. The in-order traversal indicates visiting each node only once in a tree structure, and is a scheme of traversing a left subtree, visiting a root node and traversing a right subtree. Based on the in-order traversal, "I ate a Chicago pizza with my bro last Sunday" is determined as the output sequence 1120.

Figure 12:
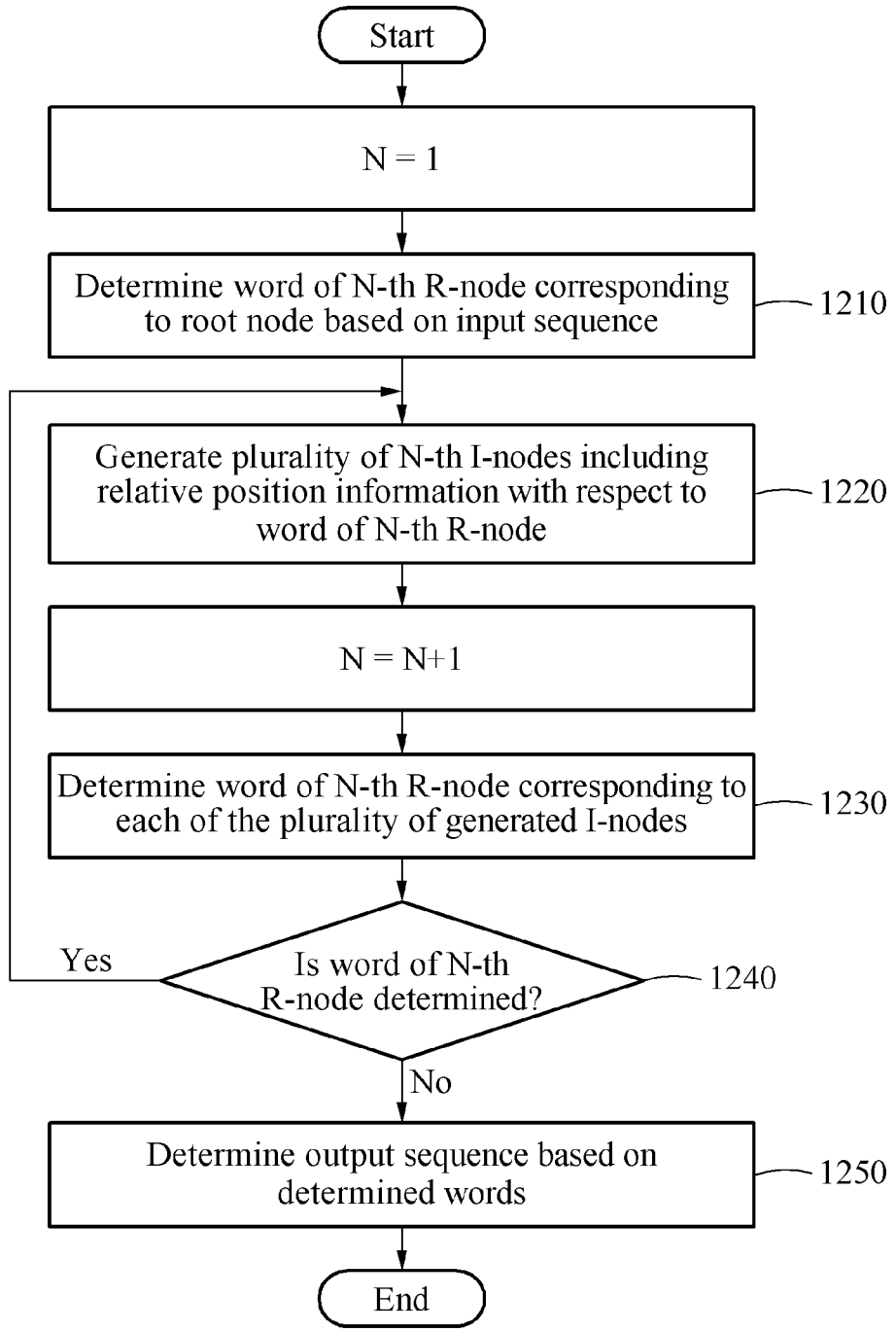
FIG. 12 is a diagram illustrating an example of a sequence processing method.

FIG. 12 is a diagram illustrating an example of a sequence processing method. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. In addition to the description of FIG. 12 below, the descriptions of FIGS. 1-11 is also applicable to FIG. 12 and are incorporated herein by reference. Thus, the above description may not be repeated here.

The blocks of the sequence processing method of FIG. 12, and combinations of the blocks, can be implemented by special purpose hardware-based computer, and devices such as a processor, that perform the specified functions, or combinations of special purpose hardware and computer instructions included in a sequence processing apparatus.

Referring to FIG. 12, in operation 1210, the sequence processing apparatus determines a word of an N-th R-node corresponding to a root node based on an input sequence. For example, N is "1". The sequence processing apparatus may determine the word of the N-th R-node to minimize a number of times an R-node and an I-node are generated for determination of an output sequence. The sequence processing apparatus may determine a word predicted to be located at the center among words included in the output sequence to be the word of the N-th R-node.

In operation 1220, the sequence processing apparatus generates a plurality of N-th !-nodes that are connected to the N-th R-node and that include relative position information with respect to the word of the N-th R-node. The plurality of N-th I-nodes include different pieces of relative position information with respect to the word of the N-th R-node. Also, a number of N-th I-nodes to be generated may be determined in advance, or may be dynamically determined based on at least one of the input sequence and the output sequence.

In an example, N is incremented to N+1.

In operation 1230, the sequence processing apparatus determines a word of an N-th R-node generated to correspond to each of the plurality of generated I-nodes. The sequence processing apparatus may determine the word of the N-th R-node based on an I-node adjacent to an I-node corresponding to the N-th R-node. For example, the sequence processing apparatus may determine the word of the N-th R-node based on an (N−1)-th R-node adjacent to an (N−1)-th R-node that is a parent node of the N-th R-node. In this example, the sequence processing apparatus may determine the word of the N-th R-node based on one (N−1)-th R-node that is selected based on the I-node corresponding to the N-th R-node from (N−1)-th R-nodes adjacent to the (N−1)-th R-node that is the parent node of the N-th R-node.

In operation 1240, the sequence processing apparatus determines whether the word of the N-th R-node is determined. In an example, when the word of the N-th R-node is determined, operation 1220 may be performed. In another example, when the word of the N-th R-node is not determined, operation 1240 may be performed.

In operation 1250, the sequence processing apparatus determines an output sequence corresponding to the input sequence based on the determined words. The sequence processing apparatus may determine the output sequence by arranging words determined in a tree structure between generated R-nodes based on an in-order traversal.

Figure 13:
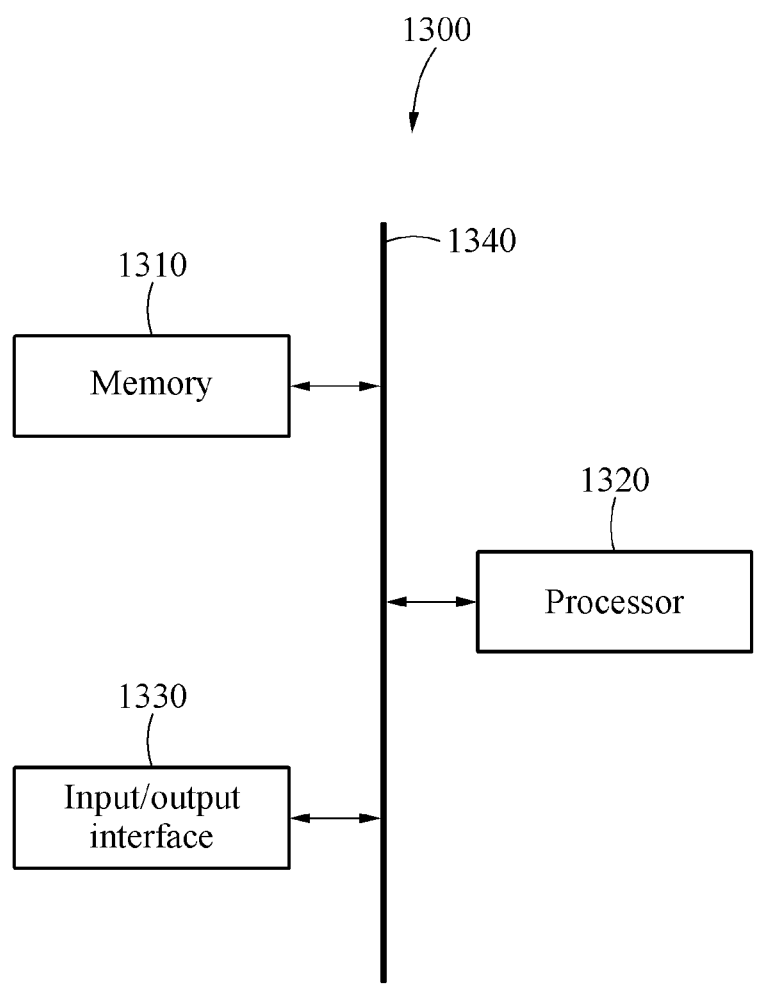
FIG. 13 illustrates an example of a sequence processing apparatus.

FIG. 13 illustrates an example of a sequence processing apparatus 1300.

Referring to FIG. 13, the sequence processing apparatus 1300 includes a memory 1310, a processor 1320 and an input/output interface 1330. The memory 1310, the processor 1320 and the input/output interface 1330 communicate with each other via a bus 1340.

In an example, the sequence processing apparatus 1300 may be implemented in various devices, such as, for example, a smart phone, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a walking assistance device, a smart speaker, a robot, various Internet of Things (IoT) devices, or a kiosk and may be performed by an application, middleware, or an operating system installed on a user device, or a program of a server interoperating with the corresponding application.

The memory 1310 includes a computer-readable instruction. The processor 1320 performs the above-described operations by executing instructions stored in the memory 1310.

The memory 1310 includes, for example, a volatile memory or a nonvolatile memory. The memory 1310 includes a large capacity storage medium such as a hard disk to store the variety of data. Further details regarding the memory 1310 is provided below.

The processor 1320 is, for example, an apparatus configured to execute instructions or programs, or to control the sequence processing apparatus 1300. The processor 1320 includes, for example, a central processing unit (CPU), a processor core, a multi-core processor, a reconfigurable processor, a multicore processor, a multiprocessor, an application-specific integrated circuit (ASIC), and a field programmable gate array (FPGA), a graphics processing unit (GPU), or any other type of multi- or single-processor configuration. Further details regarding the processor 1320 is provided below The sequence processing apparatus 1300 is connected to an external device (for example, a microphone, a keyboard, or an image sensor) via the input/output interface 1330, and exchanges data. In an example, the input/output interface 1330 may be a display that receives an input from a user or provides an output. In an example, the input/output interface 1330 may function as an input device and receives an input from a user through a traditional input method, for example, a keyboard and a mouse, and a new input method, for example, a touch input, a voice input, and an image input. Thus, the input/output interface 1330 may include, for example, a keyboard, a mouse, a touchscreen, a microphone, and other devices that may detect an input from a user and transmit the detected input to the sequence processing apparatus 1300.

In an example, the input/output interface 1330 may function as an output device, and provide an output of the sequence processing apparatus 1300 to a user through a visual, auditory, or tactile channel. The input/output interface 1330 may include, for example, a display, a touchscreen, a speaker, a vibration generator, and other devices that may provide an output to a user. In an example, the sequence processing apparatus 1300 displays examples of a process of generating a tree structure on a via the input/output interface 1330 so that a user may verify a processing process.

However, the input/output interface 1330 are not limited to the example described above, and any other displays, such as, for example, computer monitor and eye glass display (EGD) that are operatively connected to the sequence processing apparatus 1300 may be used without departing from the spirit and scope of the illustrative examples described. In an example, the input/output interface 1330 is a physical structure that includes one or more hardware components that provide the ability to render a user interface, render a display, and/or receive user.

The processor 1320 determines a word of a first R-node corresponding to a root node based on an input sequence, generates a plurality of first I-nodes that are connected to the first R-node and that include relative position information with respect to the word of the first R-node, determines a word of a second R-node generated to correspond to each of the plurality of first I-nodes, and determines an output sequence corresponding to the input sequence based on the determined words.

An encoder-decoder model and/or a neural language model used in the sequence processing apparatus 1300 may be trained in advance. For example, the encoder-decoder model and/or the neural language model may be trained to output a correct answer output sequence in response to an input of a training input sequence.

Also, the sequence processing apparatus 1300 processes the above-described operation.

The sequence processing apparatuses 110 and 1300 and other apparatuses, units, modules, devices, and other components described herein with respect to FIGS. 1 and 13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the sequence processing method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sequence processing method comprising:
    determining a word of a first R-node corresponding to a root node based on an input sequence;
    generating first I-nodes that are connected to the first R-node and include relative position information with respect to the word of the first R-node;
    determining a word of a second R-node to correspond to each of the first I-nodes; and
    determining an output sequence corresponding to the input sequence based on the determined words.

2. The sequence processing method of claim 1, wherein the determining of the word of the first R-node comprises determining the word of the first R-node to minimize a number of times an R-node and an I-node are generated for determination of the output sequence.

3. The sequence processing method of claim 1, wherein the determining of the word of the first R-node comprises determining a word expected to be located at the center from among words included in the output sequence as the word of the first R-node.

4. The sequence processing method of claim 1, further comprising:
    generating second I-nodes that are connected to the second R-node and that include relative position information with respect to the word of the second R-node, in response to the word of the second R-node being determined; and determining a word of a third R-node to correspond to each of the second I-nodes.

5. The sequence processing method of claim 1, wherein the determining of the output sequence comprises determining the output sequence based on the word of the first R-node, in response to the word of the second R-node not being determined.

6. The sequence processing method of claim 1, wherein the determining of the output sequence comprises determining the output sequence by arranging the determined words in a tree structure between generated R-nodes based on an in-order traversal.

7. The sequence processing method of claim 1, wherein the generating of the first I-nodes comprises generating a predetermined number of first I-nodes or a number of first I-nodes that is dynamically determined based on at least one of the input sequence or the output sequence, the first I-nodes comprising pieces of relative position information with respect to the word of the first R-node.

8. The sequence processing method of claim 1, wherein the determining of the word of the second R-node comprises determining the word of the second R-node based on a first I-node adjacent to a first I-node corresponding to the second R-node.

9. The sequence processing method of claim 1, further comprising:

generating second I-nodes that are connected to the second R-node and include relative position information with respect to the word of the second R-node; and determining a word of a third R-node to correspond to each of the second I-nodes based on a second R-node adjacent to a second R-node that is a parent node of the third R-node.

10. The sequence processing method of claim 9, wherein the determining of the word of the third R-node comprises determining the word of the third R-node based on one second R-node that is selected based on a second I-node corresponding to the third R-node from second R-nodes adjacent to the second R-node that is the parent node of the third R-node.

11. The sequence processing method of claim 1, wherein the determining of the word of the first R-node comprises determining the word of the first R-node using a decoder and context information of the input sequence output from an encoder receiving the input sequence.

12. The sequence processing method of claim 1, wherein the determining of the word of the first R-node comprises determining the word of the first R-node using a neural language model to which the input sequence is input.

13. The sequence processing method of claim 1, wherein the input sequence and the output sequence comprises one of sentence data, voice data, image data, biodata, or handwriting data.

14. The sequence processing method of claim 1, wherein the first R-node and the second R-node each comprise a word included in the output sequence, and the word of the second R-node is based on the relative position information of the first I-node.

15. The sequence processing method of claim 1, wherein a number of the first I-nodes is based on any one or any combination of a type of the input sequence, a type of the output sequence, and an estimated length of the output sequence.

16. A non-transitory computer-readable storage medium storing instructions that, when executed by a processor, cause the processor to perform the method of claim 1.

17. A sequence processing apparatus comprising:

a processor configured to:

determine a word of a first R-node corresponding to a root node based on an input sequence;

generate first I-nodes that are connected to the first R-node and include relative position information with respect to the word of the first R-node;

determine a word of a second R-node to correspond to each of the first I-nodes; and determine an output sequence corresponding to the input sequence based on the determined words.

18. The sequence processing apparatus of claim 17, wherein the processor is further configured to determine the word of the first R-node to minimize a number of times an R-node and an I-node are generated for determination of the output sequence.

19. The sequence processing apparatus of claim 17, wherein the processor is further configured to:

generate second I-nodes that are connected to the second R-node and that include relative position information with respect to the word of the second R-node, in response to the word of the second R-node being determined; and determine a word of a third R-node to correspond to each of the second I-nodes.

20. The sequence processing apparatus of claim 17, wherein the processor is further configured to:

determine the output sequence based on the word of the first R-node, in response to the word of the second R-node not being determined.

21. The sequence processing apparatus of claim 17, wherein the processor is further configured to determine the output sequence by arranging the determined words in a tree structure between generated R-nodes based on an in-order traversal.

* * * * *